United States Patent
Inoue

(10) Patent No.: US 8,266,458 B2
(45) Date of Patent: Sep. 11, 2012

(54) ESTIMATING POWER CONSUMPTION OF A VIRTUAL SERVER

(75) Inventor: Hiroshi Inoue, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 12/509,533

(22) Filed: Jul. 27, 2009

(65) Prior Publication Data

US 2010/0031259 A1 Feb. 4, 2010

(30) Foreign Application Priority Data

Jul. 31, 2008 (JP) ................................ 2008-198128

(51) Int. Cl.
*G06F 1/26* (2006.01)
*G06F 9/50* (2006.01)

(52) U.S. Cl. ............. 713/300; 718/104; 705/52; 702/60

(58) Field of Classification Search .................. 713/300; 718/104; 705/52; 702/60
See application file for complete search history.

(56) References Cited

U.S. PATENT DOCUMENTS

| | | | |
|---|---|---|---|
| 7,082,521 B1 * | 7/2006 | Nanja | 713/1 |
| 2006/0242642 A1 * | 10/2006 | Yamamura et al. | 718/100 |
| 2007/0283009 A1 * | 12/2007 | Takemura | 709/224 |
| 2008/0104610 A1 * | 5/2008 | Norton et al. | 718/108 |

FOREIGN PATENT DOCUMENTS

JP 2004-135084 4/2004

OTHER PUBLICATIONS

Beginning of Virtual Machine, Journal of Information Processing Society of Japan, vol. 48, No. 8, pp. 903-905, Aug. 2007.

* cited by examiner

*Primary Examiner* — Thuan Du
(74) *Attorney, Agent, or Firm* — Vazken Alexanian

(57) ABSTRACT

Embodiments of the invention disclose a system and a method for estimating the power consumption of virtual servers that operate in various hardware configurations and making a charge. The system consists of a resource utilization measurement unit that measures utilization of a hardware resource by an operation of a virtual server. The system also includes a conversion unit that converts the utilization of the hardware resource measured by the resource utilization measurement unit to utilization of a hardware resource in a case where the operation of the virtual server is performed in a reference server including a preset hardware configuration. The system further includes a virtual power consumption calculation unit that calculates, on the basis of the utilization in the reference server obtained by the conversion by the conversion unit, as power that can be assumed to be consumed by the operation of the virtual server, power consumption in a case where a similar operation is performed in the reference server. The system further has an accounting unit that makes a charge for the operation of the virtual server on the basis of the power consumption calculated by the virtual power consumption calculation unit. Other embodiments are also provided.

13 Claims, 6 Drawing Sheets

ESTIMATING POWER CONSUMPTION OF A VIRTUAL SERVER

CROSS REFERENCE TO RELATED APPLICATIONS

This application claims priority under 35 U.S.C. §119 from Japanese Patent Application number 2008-198128, filed on Jul. 31, 2008, the entire contents of which are incorporated herein by reference.

BACKGROUND OF THE INVENTION

A virtualization technique for using the hardware resources of a computer regardless of the physical configuration of the computer is known in the art. Using virtual servers, implemented by the virtualization technique, a single physical server may be logically partitioned and used as if the physical server is a plurality of servers. For example, different operating systems (OSs) and applications can run on a plurality of respective virtual servers that operate on a single physical server Typically, the use of, for example, a server device may be charged. In some known charging methods, the power consumption of a used device is measured, and a charge is made on the basis of the measured power consumption In a case where the use of a physical server is charged, a charge may be made on the basis of the power consumption. However, in a case where the use of a virtual server is charged, simple charging based on the power consumption of each device is a disadvantage. Specifically, when a plurality of virtual servers operate on a single physical server, since the hardware resources of the physical server are shared by the virtual servers, the amount of charge to the use of each of the virtual servers is affected by the operations of the other virtual servers operating on the same physical server. Moreover, in a case where the type of a used physical server (hardware resources) is changed, even when a virtual server achieves the same performance and provides the same level of service, the power consumption may vary, and thus the amount of charge may change.

BRIEF SUMMARY OF THE INVENTION

Embodiments of the invention disclose a system and a method for estimating the power consumption of a virtual server that operates in various hardware configurations. Embodiments of the invention further disclose a system and a method for making a charge on the basis of the estimated power consumption of the virtual server.

According to a first aspect of the invention is a system that includes a resource utilization measurement unit that measures utilization of a hardware resource by a server, the hardware resource being used by an operation of the server, a conversion unit that converts the utilization of the hardware resource measured by the resource utilization measurement unit to utilization of a hardware resource in a reference server including a preset hardware configuration in a case where the operation of the server is performed in the reference server, a virtual power consumption calculation unit that calculates, on the basis of the utilization in the reference server obtained by the conversion by the conversion unit, as power that can be assumed to be consumed by the operation of the server, power consumption in a case where the operation is performed in the reference server, and an accounting unit that makes a charge for the operation of the server on the basis of the power consumption calculated by the virtual power consumption calculation unit.

According to a second aspect of the invention, the resource utilization measurement unit may measure, as the utilization of the hardware resource, at least utilization of a CPU by the operation of the server.

A third of aspect of the invention further discloses that when a plurality of servers operate on the same computer, for each of the servers, the resource utilization measurement unit may measure utilization of a hardware resource, the conversion unit may convert the utilization of the hardware resource to the utilization of the hardware resource in the reference server, and the virtual power consumption calculation unit may calculate the power consumption. Moreover, an accounting unit may make a charge, for each of the servers, for the operation of the server.

A fourth aspect of the invention discloses a method for estimating power consumption of a server. The method includes a step of measuring utilization of a hardware resource by the server, the hardware resource being used by an operation of the server, a step of converting the utilization of the hardware resource to utilization of a hardware resource in a reference server, a step of calculating, on the basis of the utilization in the reference server, as power that can be assumed to be consumed by the operation of the server, power consumption in a case where the operation is performed in the reference server, and a step of making a charge for the operation of the server on the basis of the calculated power consumption in the reference server.

A fifth aspect of the invention discloses a system that includes at least one server and at least one accounting apparatus, wherein the accounting apparatus is functionally coupled to the server over a network. The server includes at least one hardware resource and the accounting device includes an accounting unit. Several other units including a virtual server management unit, a resource utilization management unit, a conversion unit, and a virtual power consumption calculation unit, may be distributed amongst the server and the accounting apparatus.

Other embodiments of the invention are disclosed in the dependent claims.

BRIEF DESCRIPTION OF THE DRAWINGS

Embodiments of the present invention are described in detail below, by way of example only, with reference to the following schematic drawings, where.

DETAILED DESCRIPTION OF THE INVENTION

Embodiments of the invention will now be described in detail with reference to the drawings.

In one embodiment, in order to estimate power consumption based on the use of a virtual server, a reference server that includes a specific hardware configuration is presumed. Then, the utilization of computing resources by the virtual server (i.e., the utilization of the hardware resources of a physical server on which the virtual server is implemented) is converted to the utilization of computing resources in the reference server, and power consumption based on the utilization of computing resources in the reference server is calculated. The obtained power consumption is considered as power consumption based on the use of the virtual server. The power consumption of the reference server considered as the power consumption of the virtual server is called virtual power consumption.

Figure 1:
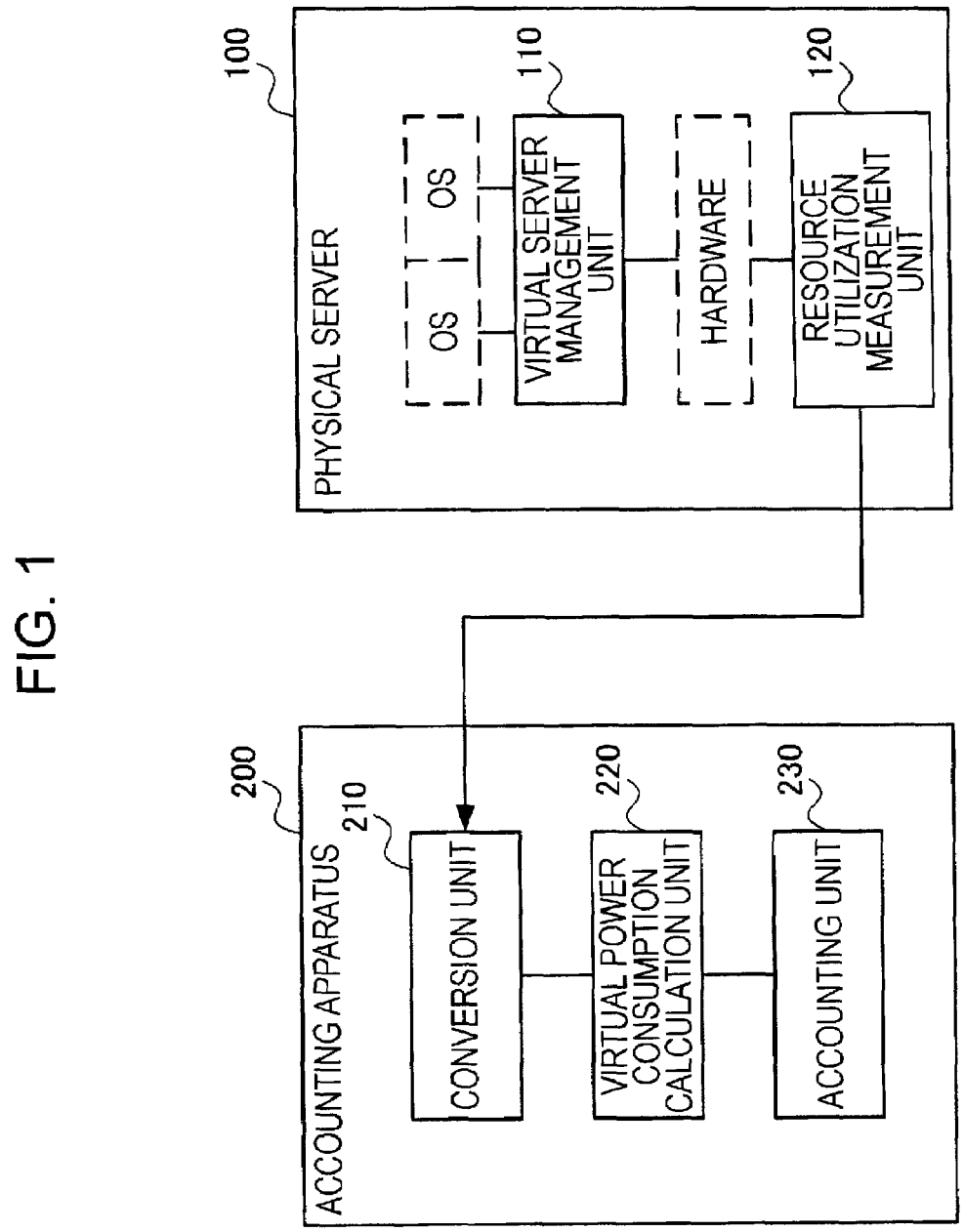
FIG. 1 shows an exemplary configuration of an accounting system according to an embodiment.

FIG. 1 shows an exemplary configuration of an accounting system according to the present embodiment. Referring to FIG. 1, the accounting system according to the present embodiment includes a physical server 100 on which virtual servers to be charged are implemented and an accounting apparatus 200. In the exemplary configuration shown in FIG. 1, the single physical server 100 is connected to the accounting apparatus 200. Alternatively, a plurality of the physical servers 100 may be connected to the accounting apparatus 200.

The physical server 100 includes a virtual server management unit 110 that implements a virtual server and a resource utilization measurement unit 120 that measures the utilization of computing resources by a virtual server. The accounting apparatus 200 includes a conversion unit 210 that converts the utilization of computing resources (hardware resources) by a virtual server to the utilization of computing resources in a reference server and a virtual power consumption calculation unit 220 that calculates virtual power consumption on the basis of the result of the calculation by the conversion unit 210. If a memory is taken as an example of the hardware resource of a virtual server, the conversion unit 210 converts a memory utilization to a reference server memory utilization. The accounting apparatus 200 further includes an accounting unit 230 that performs accounting on the basis of the result of the calculation by the virtual power consumption calculation unit 220. The resource utilization measurement unit 120 in the physical server 100 sends the measured utilization of computing resources (hereinafter called resource utilization) to the accounting apparatus 200. The conversion unit 210 in the accounting apparatus 200 calculates resource utilization in a reference server on the basis of the resource utilization received from the resource utilization measurement unit 120 in the physical server 100.

Figure 2:
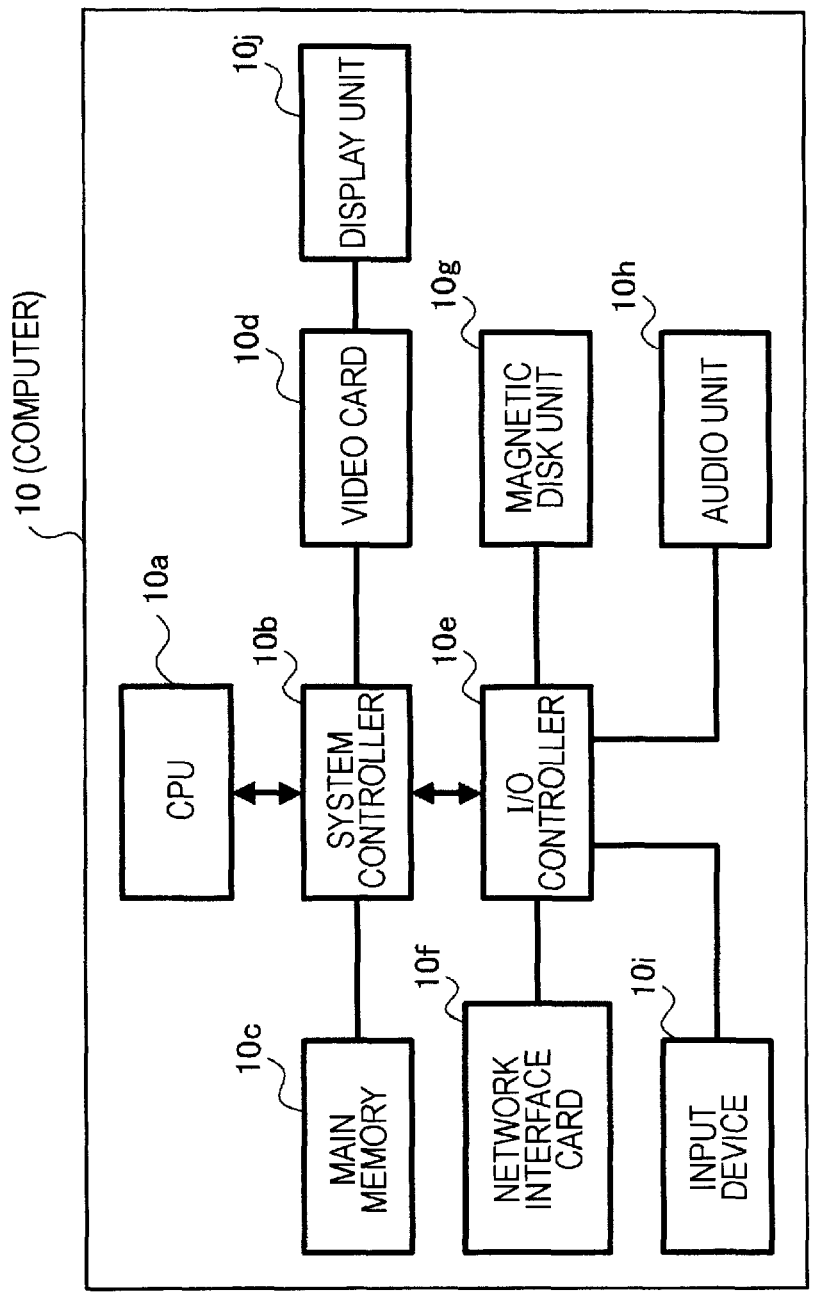
FIG. 2 shows an exemplary hardware configuration of a computer that implements each of a physical server and an accounting apparatus in FIG. 1.

FIG. 2 shows an exemplary hardware configuration of a computer that implements each of the physical server 100 and the accounting apparatus 200 in FIG. 1. A computer 10 shown in FIG. 2 includes a central processing unit (CPU) 10a that is calculation means and a main memory 10c and a magnetic disk unit (hard disk drive (HDD)) 10g that are storage means. The computer 10 further includes a network interface card 10f that connects to an external unit via a network, a video card 10d and a display unit 10j for display output, and an audio unit 10h for audio output. The computer 10 further includes an input device 10i such as a keyboard or a mouse.

The main memory 10c and the video card 10d are connected to the CPU 10a via a system controller 10b, as shown in FIG. 2. Moreover, the network interface card 10f, the magnetic disk unit 10g, the audio unit 10h, and the input device 10i are connected to the system controller 10b via an I/O controller 10e. The components are connected to each other via various types of buses, such as a system bus and an input/output bus. For example, the CPU 10a and the main memory 10c are connected to each other via, for example, a system bus or a memory bus. Moreover, the CPU 10a, the magnetic disk unit 10g, the network interface card 10f, the video card 10d, the audio unit 10h, the input device 10i, and the like are connected to each other via an input/output bus, for example, Peripheral Components Interconnect (PCI), PCI Express, serial AT Attachment (ATA), Universal Serial Bus (USB), or Accelerated Graphics Port (AGP).

FIG. 2 shows just an exemplary hardware configuration of a computer to which the present embodiment is suitably applied, and the configuration of each actual server is not limited to that illustrated. For example, instead of the video card 10d, only a video memory may be provided, and the CPU 10a may perform image data processing. Moreover, the audio unit 10h may not be separately provided but may be provided as a function of a chipset that constitutes the system controller 10b, the I/O controller 10e, and the like. Moreover, in addition to the magnetic disk unit 10g, a drive in which, for example, various types of optical disks or flexible disks are used as media may be provided as an auxiliary storage unit. A liquid crystal display is mainly used as the display unit 10j. Alternatively, any type of display, such as a CRT display or a plasma display, may be used as the display unit 10j.

In the physical server 100 shown in FIG. 1, the respective functions of the virtual server management unit 110 and the resource utilization measurement unit 120 are implemented by, for example, executing programs read into the main memory 10c by the CPU 10a in the computer 10 shown in FIG. 2. Moreover, similarly, the respective functions of the conversion unit 210, the virtual power consumption calculation unit 220, and the accounting unit 230 in the accounting apparatus 200 are implemented by executing programs read into the main memory 10c by the CPU 10a in a computer that constitutes the accounting apparatus 200.

Virtual servers are implemented by the virtual server management unit 110 in the physical server 100 and OSs running on the virtual server management unit 110. The virtual server management unit 110 assigns, to the individual OSs, the right of using, for example, a CPU and a memory that are computing resources in the physical server 100 and manages the operations of the OSs on the physical server 100. Thus, a plurality of OSs of various types can run on the physical server 100, so that virtual servers are implemented by these OSs. The function of the virtual server management unit 110 is implemented by, for example, executing existing software for implementing virtual servers in the physical server 100.

The resource utilization measurement unit 120 measures resource utilization for each virtual server implemented by the virtual server management unit 110 and an OS. The specific method for calculating resource utilization varies with the type of a computing resource to be measured. For example, CPU utilization can be measured by obtaining information on a schedule of allocation of time to individual OSs performed by the virtual server management unit 110 and the results of usage. Moreover, memory utilization can be measured by referring to a page table managed by each OS. These items of information can be also obtained from the virtual server management unit 110, which manages the operation of each OS. Thus, although the virtual server management unit 110 and the resource utilization measurement unit 120 are separately described in FIG. 1 to distinguish between the respective functions, in actual packaging, the function of the resource utilization measurement unit 120 may be provided as a part of the function of the virtual server management unit 110. Moreover, in the exemplary configuration in FIG. 1, the resource utilization measurement unit 120 is provided in the physical server 100. Alternatively, the resource utilization measurement unit 120 may be provided in the accounting apparatus 200, and information to be used by the resource utilization measurement unit 120 to measure resource utilization may be sent from the virtual server management unit 110.

The conversion unit 210 in the accounting apparatus 200 obtains resource utilization in the physical server 100 measured by the resource utilization measurement unit 120 and converts the resource utilization to resource utilization in a reference server (virtual resource utilization). A reference server includes a server configuration presumed for calculating virtual power consumption that is the power consumption of each virtual server, and the CPU type, the memory type, the storage capacity, and other hardware configuration items are set in advance. The relationship (performance ratio) between resource utilization in the physical server 100 and resource utilization in a reference server measured when the same operation is performed in the physical server 100 and the reference server is examined in advance for resource utilization conversion. Then, information on the obtained relationship between resource utilizations is stored in storage means, for example, the main memory 10c or the magnetic disk unit 10g in FIG. 2. A specific method for examining the relationship between resource utilizations is described below.

The virtual power consumption calculation unit 220 calculates power consumption corresponding to virtual resource utilization calculated by the conversion unit 210 in a reference server. Thus, power consumption necessary when the same processing as processing performed in a virtual server is performed in the reference server is calculated. The power consumption of the reference server is virtual power consumption and is considered as power consumption based on the use of the virtual server. In order to calculate virtual power consumption, power consumption corresponding to the use of computing resources is measured in advance for a case where various types of processing are performed using a physical server (a physical reference server) that includes the same hardware configuration as the reference server. Then, an equation (a function) for obtaining virtual power consumption from virtual resource utilization is formulated on the basis of the result of the measurement in advance. Virtual power consumption is calculated using this equation on the basis of virtual resource utilization obtained from the conversion unit 210. The measurement of power consumption corresponding to actual processing in the physical reference server, the measurement being performed to formulate the equation, may be performed by, any of the existing measurement methods disclosed in the art.

The accounting unit 230 makes a charge on the basis of virtual power consumption calculated by the virtual power consumption calculation unit 220. In actual charging, existing processing performed when a charge is made for various types of devices on the basis of power consumption may be performed. For example, the amount of charge is calculated using an equation prepared in advance in which virtual power consumption is a charging parameter. Charging methods include a method for simply making a charge for the total amount of virtual power consumption and a method for making a charge separately for virtual power consumption by the use of computing resources significantly affected by, for example, the amount of processing in a virtual server and virtual power consumption by the use of other computing resources. For example, CPU utilization, memory utilization, memory bus utilization, the number of accesses to a magnetic disk unit, network utilization, and the number of revolutions of a cooling fan can be considered as resource utilizations to be charged. For example, CPU utilization, memory utilization, and the operation of a cooling fan are significantly affected by, for example, the amount of processing in a virtual server. Thus, a charge is made for these resource utilizations by calculating the amount of charge on the basis of virtual power consumption calculated by the virtual power consumption calculation unit 220. On the other hand, regarding, for example, a magnetic disk unit and a network, even when they are not actually used, for example, a predetermined storage capacity and a predetermined band need to be reserved. Thus, a fixed amount of charge may be uniformly made regardless of the resource utilization.

The operation of the accounting system having the aforementioned configuration will now be described. An exemplary method for obtaining the relationship between resource utilization and power consumption in a reference server, an exemplary method for examining the relationship between resource utilization in the physical server 100 and resource utilization in a reference server, and an exemplary procedure for calculating the amount of charge will be described.

Figure 3:
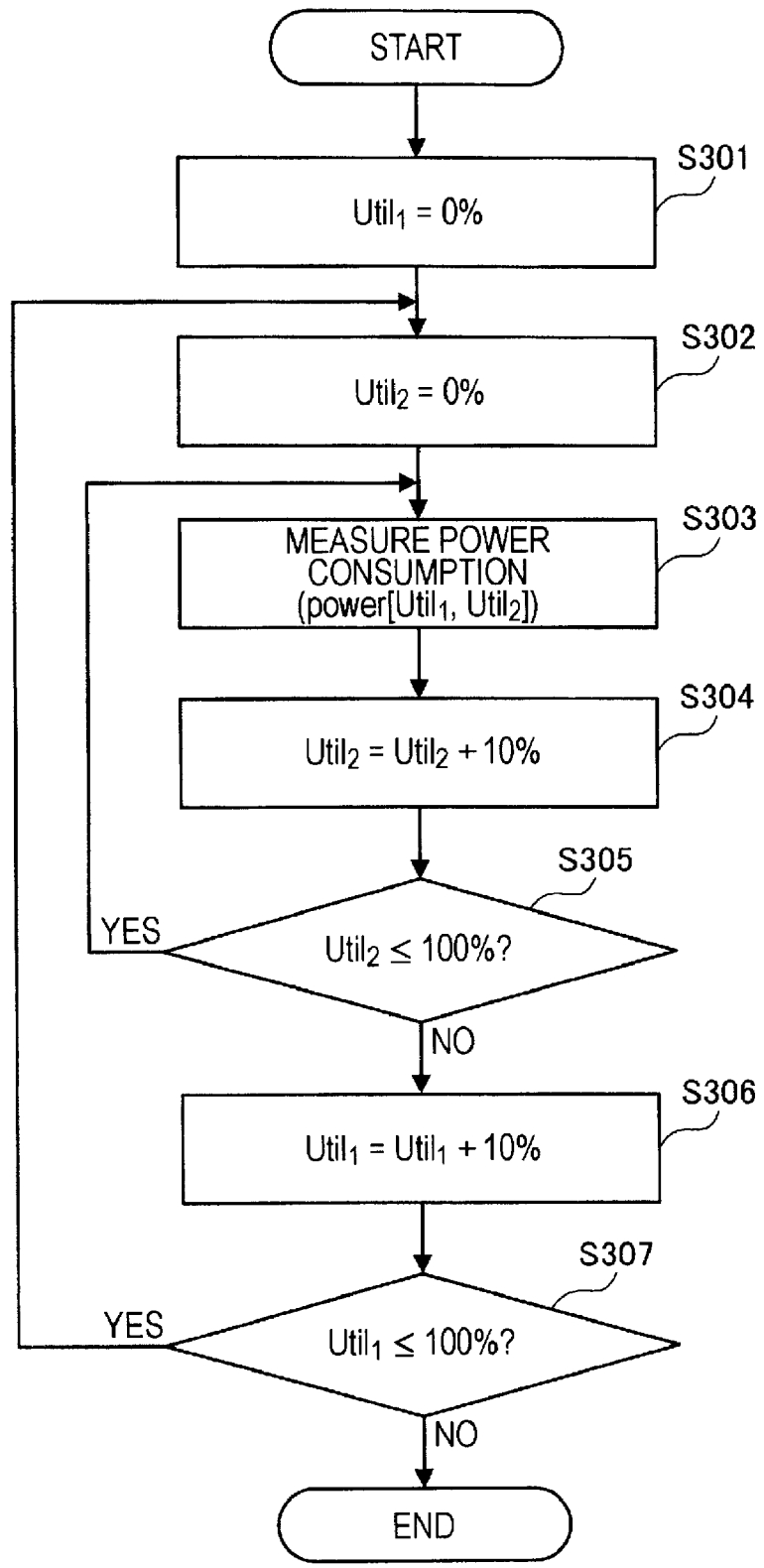
FIG. 3 is a flowchart showing a method for obtaining the relationship between resource utilization and power consumption used in the present embodiment.

FIG. 3 is a flowchart showing the method for obtaining the relationship between resource utilization and power consumption. FIG. 3 shows an example in which the respective utilizations of two computing resources (for example, CPU utilization and the utilization of a memory) are used as resource utilizations are used to obtain power consumption as a function of the respective utilizations of the two computing resources. In this example, the relationship between resource utilization and power consumption in a reference server is obtained by performing an operation shown in FIG. 3 using a physical reference server.

Referring to FIG. 3, the respective utilizations ($Util_1$, $Util_2$) of two computing resources are first initialized (steps 301 and 302). Then, power consumption (power[$Util_1$, $Util_2$]) at this time is measured (step 303). Then, the utilization $Util_2$ is increased by 10% (step 304), and it is determined whether the value of the utilization $Util_2$ exceeds 100% (step 305). When the value of the utilization $Util_2$ does not exceed 100% (Yes in step 305), the process returns to step 303, and power consumption is measured using the utilization $Util_2$ newly set in step 304.

On the other hand, when the value of the utilization $Util_2$ exceeds 100% as a result of increasing the utilization $Util_2$ by 10% (No in step 305), the utilization $Util_1$ is increased by 10% (step 306), and it is determined whether the value of the utilization $Util_1$ exceeds 100% (step 307). When the value of the utilization $Util_1$ does not exceed 100% (Yes in step 307), the process returns to step 302 where the utilization $Util_2$ is initialized (reset to 0%), and step 303 and subsequent steps are repeated.

When the value of the utilization $Util_1$ exceeds 100% (No in step 307), since the measurement of power consumption is completed for combinations of the respective utilizations $Util_1$ and $Util_2$ of the two computing resources, each of the respective utilizations $Util_1$ and $Util_2$ ranging from 0% to 100% (in increments of 10%), the process is completed. A function for calculating virtual power consumption from virtual resource utilization in a reference server is created on the basis of the relationship between resource utilization and power consumption obtained in this manner.

In the example shown in FIG. 3, power consumption is measured while changing the utilizations of computing resources in increments of, but not exclusively, 10%. Alternatively, power consumption may be measured while changing the utilizations of computing resources in smaller increments. Moreover, the relationship between resource utilization and power consumption in increments of less than 10% may be obtained by interpolation on the basis of the relationship between resource utilization and power consumption measured in increments of 10%. Moreover, in the example shown in FIG. 3, the relationship between power consumption and the respective utilizations of two computing resources is examined. Even in a case where the relationship between power consumption and the respective utilizations of more than two computing resources is examined, in a similar manner, power consumption may be measured while changing the utilization for each computing resource.

Figure 4:
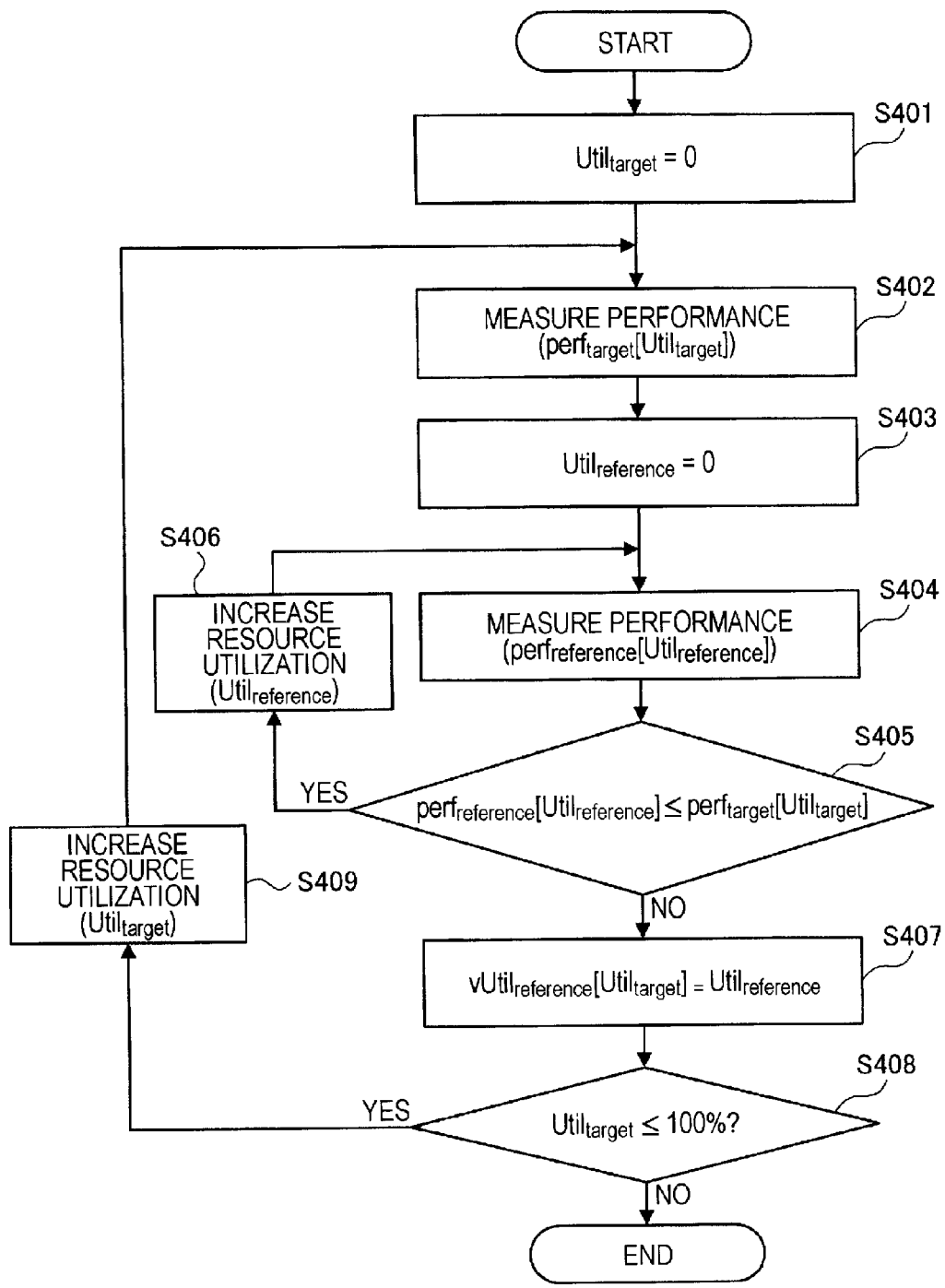
FIG. 4 is a flowchart showing a method for examining the relationship between resource utilization in a physical server and resource utilization in a reference server used in the present embodiment.

FIG. 4 is a flowchart showing the method for examining the relationship between resource utilization in the physical server 100 and resource utilization in a reference server. Referring to FIG. 4, the resource utilization ($Util_{target}$) of the physical server 100 (a target machine) is first initialized (step 401), and the performance ($perf_{target}[Util_{target}]$) of the physical server 100 is measured (step 402). Moreover, the resource utilization ($Util_{reference}$) of a physical reference server (a reference machine) is initialized (step 403), and the performance ($perf_{reference}[Util_{reference}]$) of the physical reference server is measured (step 404). In this case, the specific content of performance varies with the type of a computing resource to be measured. For example, in the case of a CPU, the number of instructions processed per predetermined time is adopted as performance.

Then, the performance ($perf_{target}[Util_{target}]$) of the physical server 100 obtained in step 402 is compared with the performance ($perf_{reference}[Util_{reference}]$) of the physical reference server obtained in step 404 (step 405). When the performance ($perf_{target}[Util_{target}]$) of the physical server 100 is higher (Yes in step 405), the resource utilization ($Util_{reference}$) of the physical reference server is increased (step 406), the performance ($perf_{reference}[Util_{reference}]$) is measured again (step 404), and the performances are compared with each other (step 405).

When the performance ($perf_{reference}[Util_{reference}]$) of the physical reference server becomes equal to or more than the performance ($perf_{target}[Util_{target}]$) of the physical server 100 (No in step 405), the resource utilization ($Util_{reference}$) of the physical reference server at this time is set as virtual resource utilization ($vUtil_{reference}[Util_{target}]$) corresponding to the resource utilization ($Util_{target}$) of the physical server 100 at this time (step 407).

Then, it is determined whether the current resource utilization ($Util_{target}$) of the physical server 100 is equal to or less than 100% (step 408). When the current resource utilization ($Util_{target}$) of the physical server 100 is equal to or less than 100% (Yes in step 408), the resource utilization ($Util_{target}$) of the physical server 100 is increased (step 409), and step 402 and subsequent steps are repeated. On the other hand, when the resource utilization ($Util_{target}$) of the physical server 100 exceeds 100% (No in step 408), the process is completed. A function (a conversion equation) for calculating the virtual resource utilization of the reference server from the resource utilization of the physical server 100 is created on the basis of the relationship between resource utilization in the physical reference server and resource utilization in the physical server 100 obtained in this manner. In this case, in steps 406 and 409, the resource utilization is increased in increments of, for example, 10%. Processing such as linear interpolation or normalization is performed as appropriate.

When the ratio of the performance of the physical server 100 to that of the reference server is examined by the operation in FIG. 4, for example, the same benchmark score is measured in the physical server 100 and the physical reference server to determine the specific performance of each of the servers. The benchmark score may be measured by performing a general-purpose benchmark test. When the purpose of a virtual server is determined (for example, the virtual server is used only as a web server), the benchmark score may be measured by performing a specific benchmark test corresponding to the purpose.

Figure 5:
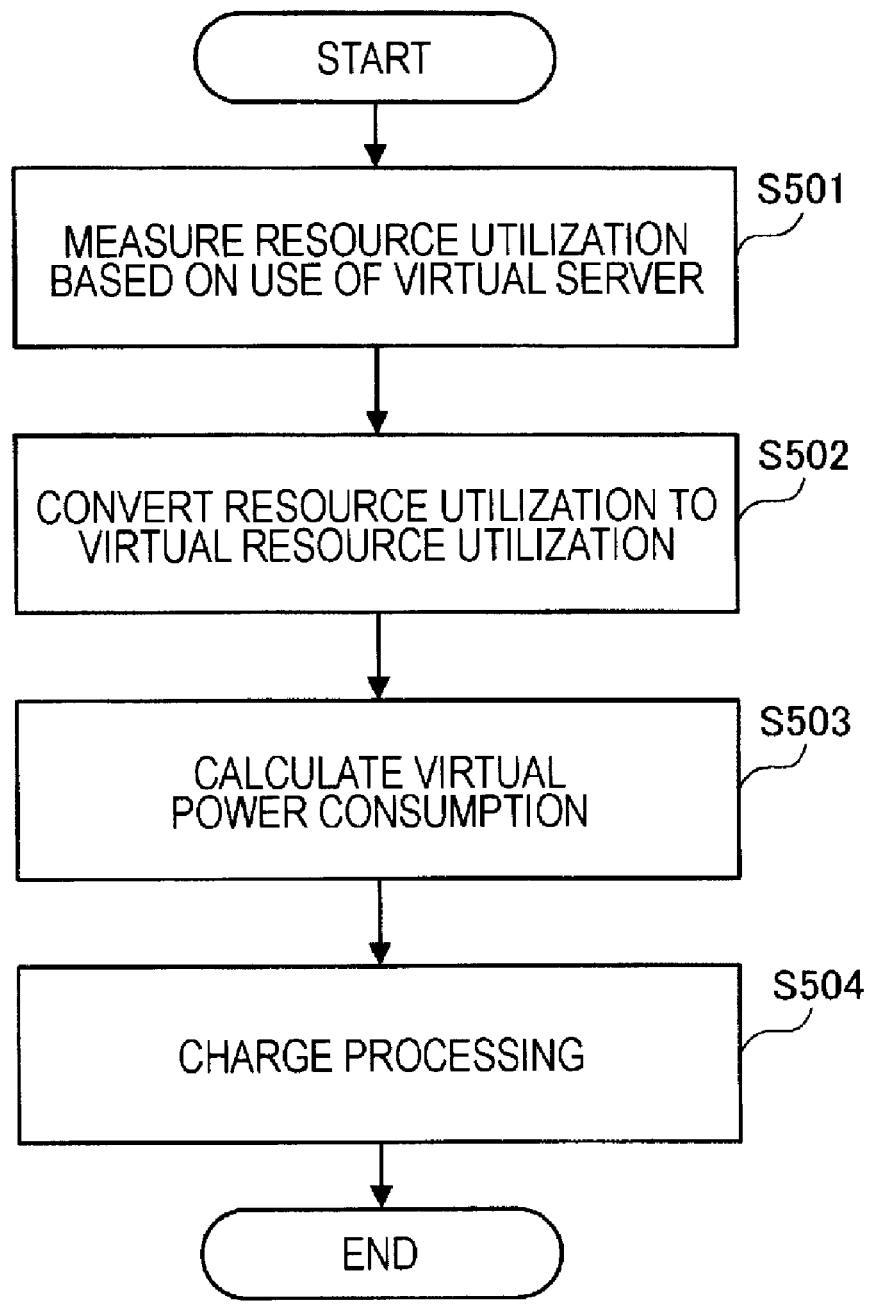
FIG. 5 is a flowchart showing the flow of making a charge in the accounting system in the present embodiment.

FIG. 5 is a flowchart showing the flow of making a charge in the accounting system shown in FIG. 1.

In the accounting system according to the present embodiment, the resource utilization measurement unit 120 in the physical server 100 first measures resource utilization based on the use of a virtual server, as shown in FIG. 5 (step 501). The measured resource utilization of the virtual server is sent to the accounting apparatus 200.

In the accounting apparatus 200, the conversion unit 210 converts the resource utilization received from the resource utilization measurement unit 120 to virtual resource utilization in a reference server (step 502). Then, the virtual power consumption calculation unit 220 calculates virtual power consumption on the basis of the virtual resource utilization calculated by the conversion unit 210 (step 503). Finally, the accounting unit 230 makes a charge on the basis of the virtual power consumption calculated by the virtual power consumption calculation unit 220 (step 504).

The charging for the use of the virtual server will further be described, citing a specific example. In this example, it is assumed that only CPU utilization is measured as resource utilization (i.e., a charge is made for the utilization of the CPU in the physical server 100 due to the use of the virtual server). Moreover, it is assumed that the relationship between virtual resource utilization and virtual power consumption in the reference server is that shown in FIG. 6. Moreover, it is assumed that the throughput of the physical server 100, which implements the virtual server, is one and a half times as much as that of the reference server.

The operation of the accounting system will be described, following the procedure shown in FIG. 5. It is assumed that 40% of the CPU time of the physical server 100 is used by the operation of the virtual server. The resource utilization measurement unit 120 in the physical server 100 obtains information on the CPU utilization and sends the information to the accounting apparatus 200 (refer to step 501). When the conversion unit 210 in the accounting apparatus 200 has received the information, the conversion unit 210 converts the CPU utilization in the physical server 100 to virtual resource utilization in the reference server (refer to step 502). The throughput of the physical server 100 is one and a half times as much as that of the reference server, as described above. Thus, when the same operation as the operation of the virtual server in the physical server 100 is performed in the reference server, the reference server CPU utilization is 60% (=40%× 1.5).

Figure 6:
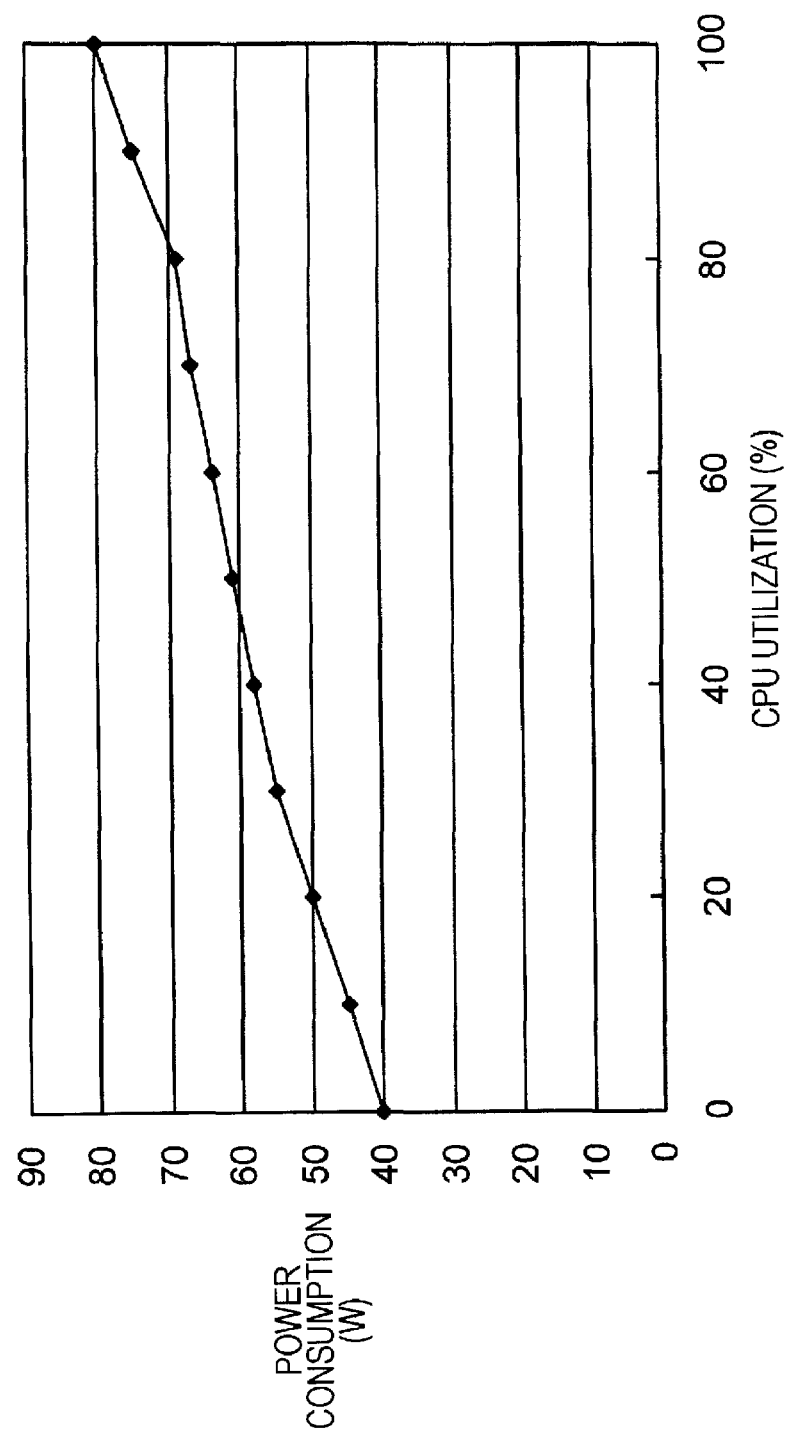
FIG. 6 shows exemplary relationship between virtual resource utilization and virtual power consumption in a reference server used in the present embodiment.

Then, the virtual power consumption calculation unit 220 in the accounting apparatus 200 calculates virtual power consumption on the basis of the virtual resource utilization in the reference server calculated by the conversion unit 210 (refer to step 503). Referring to FIG. 6 showing the relationship between virtual resource utilization and virtual power consumption in the reference server, when the CPU utilization is 60%, the virtual power consumption is about 64 W. The virtual power consumption is not affected by, for example, how much power the physical server 100 actually consumes and whether another virtual server operates on the physical server 100. In other words, the virtual power consumption corresponds only to the use of the virtual server in a virtual environment. Thus, when the accounting unit 230 makes a charge on the basis of a virtual power consumption of 64 W (refer to step 504), a charge can be made on the basis of the use of the virtual server regardless of an actual operating environment in which the virtual server operates. In a case where measured CPU time is converted to CPU time in the reference server, when the CPU time in the reference server exceeds 100%, calculation may be performed, assuming that a plurality of CPUs are used. Alternatively, such a case may be handled by making settings of the virtual server management unit 110 so that such allocation does not occur.

The charging for the use of the virtual server will further be described, citing another example. In this example, it is assumed that, together with virtual power consumption by the use of a CPU and a memory, virtual power consumption for cooling a device is considered as an object to be charged. It is assumed that the relationship between virtual resource utilization and virtual power consumption regarding CPU utilization in the reference server can be obtained by the following equation:

Virtual Power Consumption Regarding CPU Utilization=$POWER_{idle}+POWER_{cpu}$ (CPU Utilization), where $POWER_{idle}$ is virtual power consumption at idle time, and $POWER_{cpu}$ is virtual power consumption by a CPU. When the relationship between virtual resource utilization and virtual power consumption is that shown in FIG. 6, $POWER_{idle}$ is 40 W, and $POWER_{cpu}$ is a function of the CPU utilization. When the CPU utilization is 0%, $POWER_{cpu}$ is 0 W. When the CPU utilization is 100%, $POWER_{cpu}$ is 40 W.

Moreover, in a manner similar to a manner in which virtual power consumption regarding the CPU utilization is measured, a change in power consumption in a case where the amount of a physical memory is changed is measured, assuming that the CPU utilization is constant, and virtual power consumption $POWER_{mem}$ regarding the memory capacity is obtained as a function of the memory capacity. The relationship between the memory capacity and the virtual power consumption is obtained. For example, when the memory capacity is 1 GB, the virtual power consumption is 10 W, and when the memory capacity is 4 GB, the virtual power consumption is 40 W. Then, an equation for obtaining the virtual power consumption from the memory capacity is created. Then, these equations are integrated, so that virtual power consumption regarding execution of processing is expressed by the following equation:

Virtual Power Consumption Regarding Execution of Processing=$POWER_{idle}+POWER_{cpu}$ (CPU Utilization)+$POWER_{mem}$ (Memory Capacity).

Moreover, while the power consumption of the physical reference server is changed, power consumption $POWER_{cooling}$ by the operation of a cooling fan necessary to cool a device is measured. Then, the power consumption $POWER_{cooling}$ is added to the virtual power consumption. Thus, the total virtual power consumption can be expressed by the following equation:

Total Virtual Power Consumption=Virtual Power Consumption Regarding Execution of Processing+$POWER_{cooling}$ (Power Consumption For Cooling).

That is, the total virtual power consumption is obtained as the sum total of the power consumption of the reference server at idle time, the power consumption by the use of the CPU of the reference server, the power consumption corresponding to the memory usage of the reference server, and the power consumption for cooling the reference server.

The operation of the accounting system is performed, following the procedure shown in FIG. 5. That is, the resource utilization measurement unit 120 in the physical server 100 first sends, to the accounting apparatus 200, information on the CPU utilization by the operation of the virtual server, the storage capacity of the memory used by the virtual server, and the operational state of the cooling fan achieved when the virtual server operates (refer to step 501). The conversion unit 210 in the accounting apparatus 200 receives the information and converts the CPU utilization in the physical server 100 to virtual resource utilization in the reference server (refer to step 502). Then, the virtual power consumption calculation unit 220 calculates the total virtual power consumption using the aforementioned equation (refer to step 503). Then, the accounting unit 230 makes a charge on the basis of the calculated virtual power consumption (refer to step 504).

The aforementioned calculation model is just an example, and the calculation of virtual power consumption in which a CPU, a memory, and cooling of a device are considered is not limited to the calculation in which the aforementioned equation is used. For example, $POWER_{mem}$ may not be considered as a function of memory capacity to be used, and an accurate equation in which, in addition to the memory capacity to be used, the influence of, for example, the number of accesses to a memory and CPU utilization is considered may be created to calculate virtual power consumption.

In the present embodiment, actual resource utilization in the physical server 100 based on the use of a virtual server is converted to virtual resource utilization in a reference server, and virtual power consumption in the reference server is calculated on the basis of the virtual resource utilization. Then, a charge is made on the basis of the virtual power consumption. Thus, a charge can be made on the basis of the use of each virtual server regardless of an actual hardware configuration in which the virtual server is implemented. For example, even when a plurality of OSs run on the virtual server management unit 110, as shown in FIG. 1, i.e., when a plurality of virtual servers are implemented on the single physical server 100, each virtual server can be separately charged by measuring resource utilization by the use of the virtual server.

Moreover, in rental server service, the hardware configuration of the physical server 100, which implements a virtual server, may be changed due to the circumstances of a service provider. In such a case, in a case where a charge is made directly on the basis of resource utilization in the physical server 100, even when a virtual server with the same performance is provided, the amount of charge may change as the hardware configuration is changed. In contrast, in a case where a virtual server with the same performance is provided by making a charge after converting resource utilization in the physical server 100 to virtual resource utilization in a reference server, as in the present embodiment, even when the hardware configuration of the physical server 100 is changed, resource utilization in the physical server 100 is converted to resource utilization corresponding to the same reference server, and thus the amount of charge is not changed.

While the present embodiments have been described herein in an exemplary manner, the technical scope of the embodiments of the present invention is not limited to that described in the aforementioned exemplary embodiments. For example, in the aforementioned exemplary embodiment, while the respective performances of a physical reference server and the physical server 100 are compared with each other, the resource utilization of each server is adjusted so as to determine resource utilization that exhibits equivalent performance (refer to FIG. 4). On the other hand, a physical reference server and the physical server 100 may be caused to perform the same processing at the same resource utilization, and the performances achieved at this time may be compared with each other to determine the relationship between resource utilization in the physical reference server and resource utilization in the physical server 100.

Moreover, in the system configuration shown in FIG. 1, the physical server 100 and the accounting apparatus 200 are separately provided, and the resource utilization measurement unit 120 in the physical server 100 sends information on resource utilization to the conversion unit 210 in the accounting apparatus 200. Alternatively, the respective functions of the conversion unit 210 and the virtual power consumption calculation unit 220 may be provided in the physical server 100, the physical server 100 may send information on virtual power consumption to the accounting apparatus 200, and the accounting apparatus 200 may perform only charge processing. Other than this case where some of the functions of the accounting apparatus 200 are provided in the physical server 100, the respective functions of the physical server 100 and the accounting apparatus 200 may be provided in the same computer (i.e., all the functions of the accounting apparatus 200 are implemented on the specific physical server 100 so that the physical server 100 also functions as the accounting apparatus 200).

What is claimed is:

1. A system for estimating power consumption of a virtual server, the system comprising:
   at least one hardware resource;
   a conversion unit configured to convert utilization of the at least one hardware resource to utilization of a hardware resource in a reference server, wherein the reference server includes a preset hardware configuration;
   a virtual server man ement unit conf ured to implement the virtual server;
   a resource utilization measurement unit configured to measure the utilization of the at least one hardware resource, wherein the utilization is for an operation of the virtual server; and
   a virtual sower consumption calculation unit configured to calculate power consumption of the virtual server, based on the utilization of the hardware resource in the reference server.

2. The system of claim 1, further comprising:
   an accounting unit configured to make a charge for the operation of the virtual server on the basis of the power consumption of the virtual server.

3. The system of claim 1, wherein the at least one hardware resource is a Central Processing Unit (CPU).

4. The system of claim 1, wherein the at least one hardware resource is a memory.

5. A system for estimating power consumption of a virtual server, the system comprising:
   a Central Processing Unit (CPU);
   a memory;
   a conversion unit configured to:
   convert a CPU utilization to a reference server CPU utilization; and
   convert a memory utilization to a reference server memory utilization, wherein a reference server includes a preset hardware configuration;
   a virtual server management unit, wherein the virtual server management unit is configured to implement the virtual server;
   a resource utilization measurement unit configured to measure the CPU utilization and the memory utilization, wherein the CPU utilization and the memory utilization are for an operation of the virtual server; and
   a virtual power consumption calculation unit configured to calculate the power consumption of the virtual server based on the reference server CPU utilization and the reference server memory utilization.

6. The system of claim 5, wherein the power consumption is computed using an equation:
   power consumption=$POWER_{idle}$+$POWER_{cpu}$+$POWER_{mem}$+$POWER_{cooling}$,
   wherein
   $POWER_{idle}$ is power consumption of the reference server at idle time,
   $POWER_{cpu}$ is power consumption by the reference server CPU utilization calculated by the conversion unit,
   $POWER_{mem}$ is power consumption corresponding to the reference server memory utilization calculated by the conversion unit, and
   $POWER_{cooling}$ is power consumption for cooling the reference server.

7. A method for estimating power consumption of a virtual server, the method comprising:
   measuring utilization of at least one hardware resource by the virtual server, the at least one hardware resource being used by an operation of the virtual server;
   converting the utilization of the at least one hardware resource to utilization of a hardware resource in a reference server, wherein the reference server includes a preset hardware configuration; and
   calculating power consumption of the virtual server, based on the utilization of the hardware resource in the reference server.

8. A computer readable storage medium tangibly embodying a computer readable program code having computer readable instructions which, when implemented, cause a computer to carry out the steps of the method comprising the steps of claim 7.

9. The method according to claim 7, wherein the power consumption is computed using an equation:
   power consumption=$POWER_{idle}$+$POWER_{cpu}$+$POWER_{mem}$+$POWER_{cooling}$,
   wherein
   $POWER_{idle}$ is power consumption of the reference server at idle time,
   $POWER_{cpu}$ is power consumption by the reference server CPU utilization calculated by the conversion unit,
   $POWER_{mem}$ is power consumption corresponding to the reference server memory utilization calculated by the conversion unit, and
   $POWER_{cooling}$ is power consumption for cooling the reference server.

10. The method of claim 7, further comprising:
    making a charge for the operation of the virtual server on the basis of the power consumption of the reference server.

11. A system for estimating power consumption of a virtual server, the system comprising:
    at least one server;
    at least one accounting apparatus, wherein the accounting apparatus is functionally coupled to the at least one server over a network; and
    wherein the at least one server includes:
    at least one hardware resource
    at least one of a virtual server management unit, a resource utilization management unit, a conversion unit, and a virtual power consumption calculation unit wherein
    the conversion unit is configured to convert utilization of the at least one hardware resource to utilization of a hardware resource in a reference server, wherein the reference server includes a preset hardware configuration, the resource utilization measurement unit is configured to measure the utilization of the at least one hardware resource, wherein the utilization is for an operation of the virtual server, the virtual server management unit is configured to implement the virtual server, and the virtual power consumption calculation unit is configured to calculate power consumption of the virtual server, based on the utilization of the hardware resource in the reference server.

12. The system of claim 11, wherein the at least one accounting apparatus includes an accounting unit, wherein the accounting unit is configured to make a charge for an operation of the virtual server based on the power consumption of the virtual server.

13. The system of claim 12, wherein the at least one accounting apparatus further includes at least one of a virtual server management unit, a resource utilization management unit, a conversion unit, and a virtual power consumption calculation unit, wherein the conversion unit is configured to convert utilization of the at least one hardware resource to utilization of a hardware resource in a reference server, wherein the reference server includes a preset hardware configuration, the resource utilization measurement unit is configured to measure the utilization of the at least one hardware resource, wherein the utilization is for an operation of the virtual server, the virtual server management unit is configured to implement the virtual server, and the virtual power consumption calculation unit is configured to calculate power consumption of the virtual server, based on the utilization of the hardware resource in the reference server.

* * * * *